Figure 3:
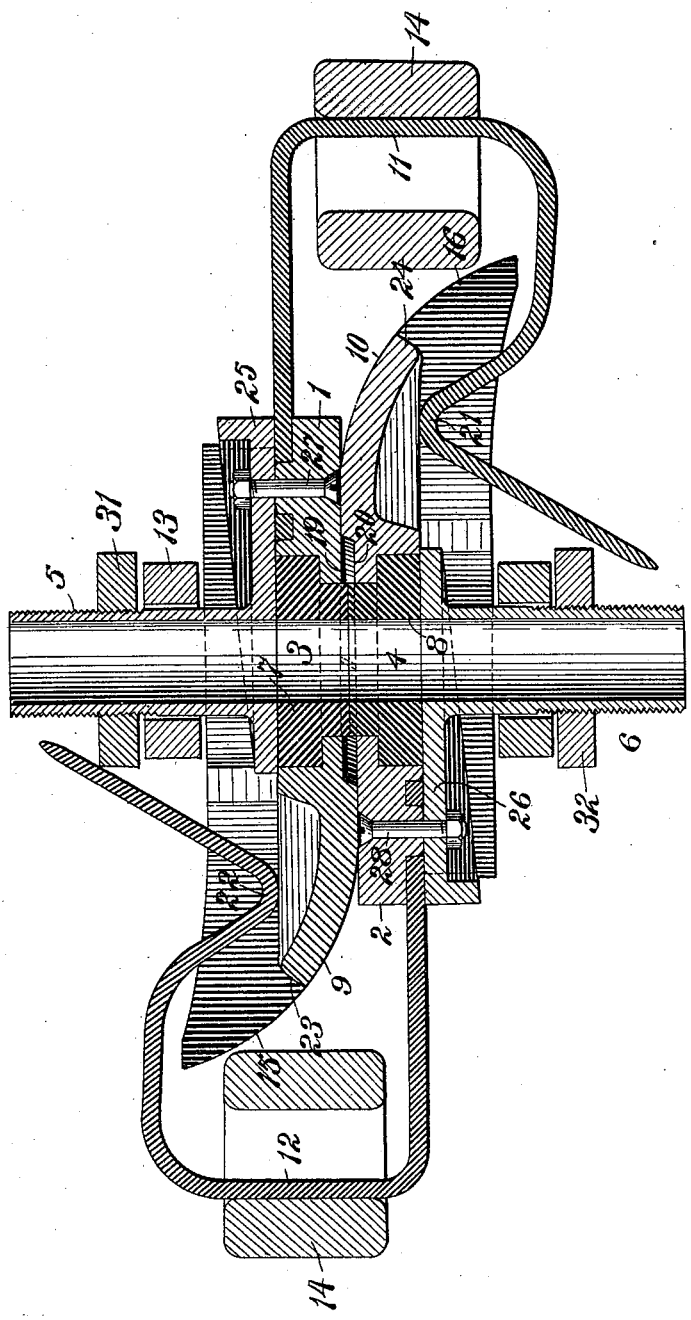

(No Model.) 2 Sheets—Sheet 1.
J. B. THOMAS.
PIPE COUPLING.
No. 582,559. Patented May 11, 1897.
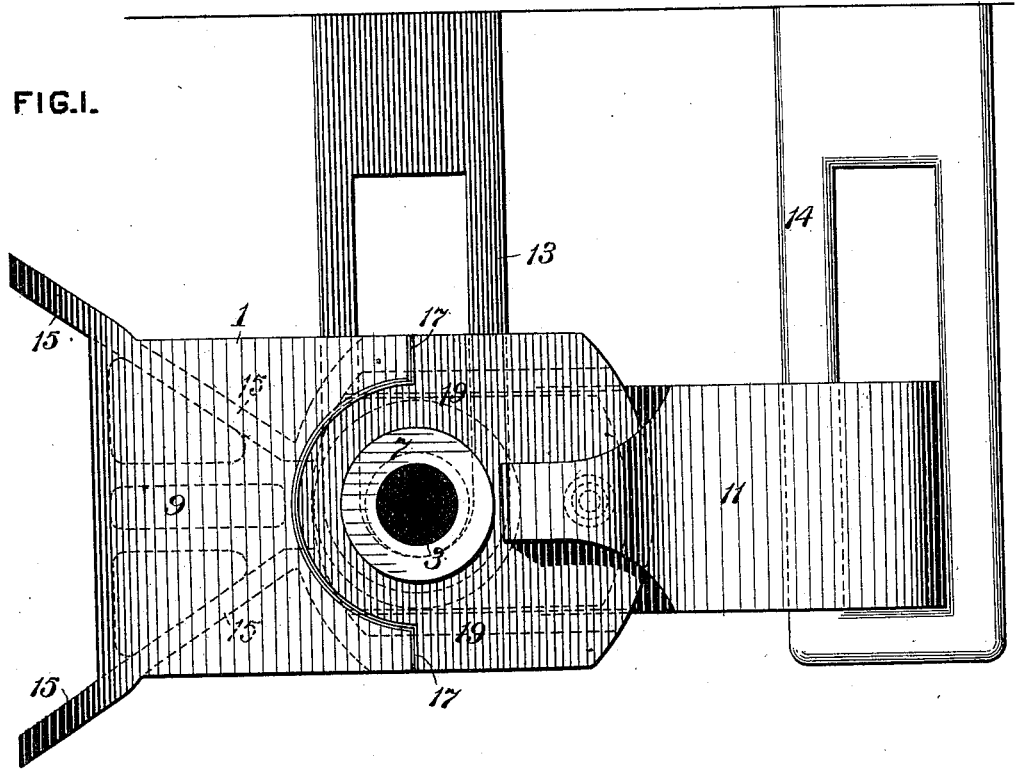
FIG.I.
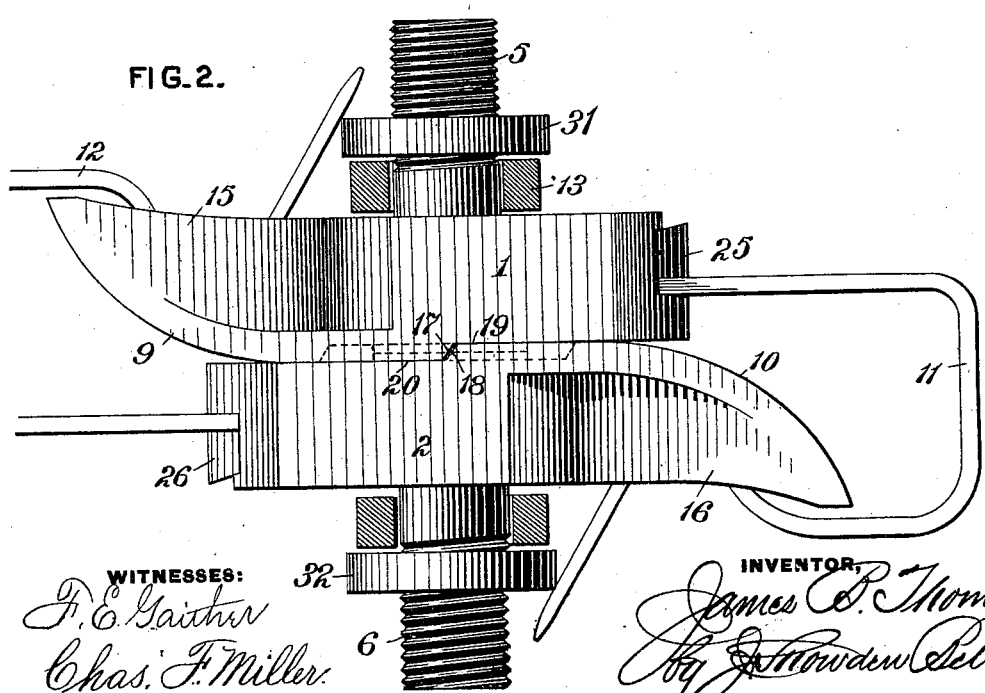
FIG.2.
WITNESSES:
F. E. Gaither
Chas. F. Miller.
INVENTOR,
James B. Thomas,
By Snowden Bell.
Att'y.
THE NORRIS PETERS CO., PHOTO-LITHO., WASHINGTON, D. C.

(No Model.)

2 Sheets—Sheet 2.

J. B. THOMAS.
PIPE COUPLING.

No. 582,559.　　　　　　　Patented May 11, 1897.

UNITED STATES PATENT OFFICE.

JAMES BRYANT THOMAS, OF ST. LOUIS, MISSOURI, ASSIGNOR TO THE AUTOMATIC AIR AND STEAM COUPLER COMPANY, OF EAST ST. LOUIS, ILLINOIS.

PIPE-COUPLING.

SPECIFICATION forming part of Letters Patent No. 582,559, dated May 11, 1897.

Application filed August 30, 1895. Serial No. 560,978. (No model.)

*To all whom it may concern:*

Be it known that I, JAMES BRYANT THOMAS, a citizen of the United States, residing at the city of St. Louis, in the State of Missouri, have invented or discovered a certain new and useful Improvement in Pipe-Couplings, of which improvement the following is a specification.

The object of my invention is to provide a simple and efficient device for coupling together the ends of two sections of pipe, which shall be specially adapted for automatically effecting such coupling without the necessity of any handling or manipulation of the device.

The improvement claimed is hereinafter fully set forth.

My improvement is more particularly designed for employment on the cars of railway-trains for connecting the ends of the sections of pipe under or on two adjacent cars in a train, and is adapted to be operated by the coming together of two cars, so as to couple automatically the sections of pipe under the two cars without the necessity of a trainman or other person going between the cars.

My improved coupling is also adapted to be uncoupled by the movement of the cars away from one another when the cars are uncoupled or separated, either accidentally or intentionally.

My improved coupling consists of two parts which are duplicates of one another, each of the parts being located in position to couple with a similar part and provided with one or more openings communicating with a connected section or sections of pipe. The openings in each part of the coupling are provided with gaskets or packing devices, of rubber or other suitable material, the openings through which are adapted to register when the two parts of the coupling are brought together.

The leading feature of my improvement consists in means whereby the movement of the two parts of the coupling over one another in the act of coupling them together is prevented from damaging the gaskets and whereby the gaskets are kept out of contact with one another and with the opposite part of the coupling during such movement and are brought together when the gaskets and the openings through them are in position to register if brought together.

In the accompanying drawings, Figure 1 is a view of the face of one of the parts or half-sections of a coupling embodying my invention; Fig. 2, a plan view showing the two half-sections coupled together, and Fig. 3 a longitudinal central section through a coupling with the two parts coupled together.

While my improved coupling is shown in the drawings as consisting of two half-sections, parts, or members 1 and 2, which are of exactly the same form in all respects, my improvement is not limited to a construction in which the half-sections or parts 1 and 2 are of the exact form shown or in which the forms of the half-sections or members 1 and 2, which may be coupled together, are exactly the same. It is, however, an essential feature of my invention that one or both of the half-sections be provided with means whereby the gaskets are protected in the act of coupling and are prevented from rubbing together or against the opposite half-section in the act of coupling and are adapted to be brought into contact with one another, so that the openings through them will register at the proper time. It will be obvious that mere variations in the form of some of the parts which do not affect this feature may be made without departing from my invention.

In the drawings the complete coupling is shown as consisting of two half-sections or members 1 and 2 with openings 3 and 4 which communicate with sections of pipe 5 and 6, leading to, connecting with, or forming part of the pipe-sections which are to be brought into communication. Gaskets or other packing devices 7 and 8 are fitted in or around the openings 3 and 4 in the faces of the half-sections and project therefrom in position to bear against one another and form a tight joint when the two half-sections are coupled together. Each half-section is provided with a curved or inclined outwardly-flaring end surface 9 or 10, which acts as a guide to engage with and guide the similarly-formed end portion of the other half-section as the two half-sections approach each other, and to the inner end of each half-section is secured a spring 11 or 12, which is adapted to engage with and press on the back of the opposite coupling-section, so as to hold the sections together.

The half-sections may be located in any desirable position at the ends of the cars and may be secured or connected to the car-body or to the couplings by which the cars are connected together. In the drawings I have shown the brackets 13 and 14 extending downward from some part of the car or car-coupling for this purpose. The pipe 5 or 6 passes through one of the brackets 13 and is supported thereby, and the spring 11 or 12 passes through and is supported by one of the brackets 14.

The lateral lost motion between the hanger 13 and the half-section supported thereby may be limited or adjusted by means of a washer or nut 31 or 32, as shown in the drawings, or by some fixed part of the half-section. As shown in the drawings, the washers 31 and 32 are in position to act as stops for the ends of the spring 11 and 12 and to resist or prevent movement of the half-sections beyond the coupled position.

The bracket or support 14 is so constructed as to permit comparatively free movement of the spring therein and forms a stop against which the spring bears when the half-sections are being coupled and also limits the outward movement of the half-section.

On the backs of the half-sections 1 and 2 are formed flanges 15 and 16, which flare outwardly toward and project beyond the ends of the half-sections in position to catch between them the ends of the bent springs 11 and 12 and to guide the springs into position on the backs of the half-sections.

The surfaces 9 and 10 on the two half-sections extend inwardly toward the openings 3 and 4 and are offset from the portions 19 and 20 of the face of each half-section in which the gaskets 7 and 8 are fitted. It is not necessary that the surfaces 9 and 10 should be curved throughout the whole of their extent, and, if preferred, their inner portions which bear on the face of the opposite half-section when coupled may be plane surfaces.

The inner edges of the offset portions 9 and 10 of the half-sections form shoulders 17 and 18, which are inclined or beveled and form the offset between the surfaces 9 and 19 and 10 and 20 on each of the half-sections. The extent of the offset of the portions 9 and 10 is such that the outer edges or ends of the gaskets which form the joint between two coupled sections of pipe will not at any time project beyond a plane touching the outer edge of the shoulder or offset 17 or 18 on its own half-section and parallel to or slightly inclined to the surface 19 or 20, from which the gasket projects. By means of this construction when two half-sections are brought together to be coupled the portions 9 and 10 engage with and slide on one another, the backward movement of each half-coupling being limited by its supports. The curved or bent portions 21 and 22 of the springs 11 and 12 pass between the flanges 15 and 16 and slide over the inclined surfaces 23 and 24 into position on the back of the half-sections and in doing so press the surfaces 9 and 10 together. The offset surfaces 9 and 10 while thus moving over and in contact with one another keep the gaskets in their half-sections out of contact with one another until the shoulders or offsets 17 on one half-section come in line with the shoulders or offsets 18 on the other half-section, when the action of the springs 11 and 12 will cause the shoulders on the opposite half-section to slide on one another or to move laterally to one another, so as to permit the surfaces 9 and 10 to bear on the surfaces 19 and 20. This will occur when and only when the gaskets 7 and 8 are in such positions opposite to one another that the lateral movement of the half-sections will bring the gaskets together so that the openings 3 and 4 will register with one another and the gaskets will form a tight joint around the openings.

When the cars are uncoupled and moved apart or when they are separated by accident, the half-sections are allowed only a limited movement outward by their connections or supports and the two half-sections which have been coupled together are pulled apart and uncoupled by the movement of one or both of the cars. When the half-sections are thus pulled apart, the inclined surfaces of the shoulders 17 and 18 slide on one another and move the half-sections and the gaskets 7 and 8 laterally apart, and thereby prevent the gaskets from rubbing against one another as the half-sections are moved longitudinally.

In the construction shown in the drawings the gaskets 7 and 8 and the springs 11 and 12 are held in place by means of a plate 25 or 26, which is secured to the back of each half-section by means of bolts 27 and 28, the plates 25 and 26 being formed integral with the pipes or nozzles 5 and 6.

If preferred, the springs and the gaskets may be secured in place by separate means, and the plate 25 or 26 may be formed integral with the half-section 1 or 2, and the pipe 5 or 6 screwed into it.

The gaskets 7 and 8 may be fitted into the openings in the faces of the couplings as in the ordinary Westinghouse pipe-coupling.

It will be seen that with my improvement the surfaces 19 and 20 are kept out of contact with the surfaces 9 and 10, and the gaskets are held apart and out of contact with the surfaces 9 and 10 until the half-sections are in what may be called "coupling" position—that is, when the openings through the gaskets are opposite to one another and the shoulders 17 and 18 are in position to permit the springs to press the gaskets together. The half-sections may then be said to be in coupling contact.

I claim as my invention and desire to secure by Letters Patent—

1. In a pipe-coupling comprising two half-sections, the combination, with one of the coupling-sections, of means whereby the half-sections are held laterally away from the coupled position until the portions of the coupling which are brought into contact to form the union or joint between the pipes are in position to register with one another by a lateral movement, substantially as set forth.

2. In a pipe-coupling, comprising two half-sections the combination, with one of the half-sections, of an offset portion which is adapted to hold the half-sections laterally apart or away from the coupled position to prevent contact between the pipe-coupling surfaces or members while moving longitudinally in the act of coupling, and means whereby the surfaces or members are permitted to approach each other by a final lateral movement, substantially as set forth.

3. In a pipe-coupling, the combination, with two half-sections, which are adapted to be coupled by a longitudinal and lateral movement relatively to one another, of means for holding the half-sections laterally apart until the longitudinal movement is completed, and then permitting a lateral movement by which a tight joint is effected, substantially as set forth.

4. In an automatic pipe-coupling, the combination, with one of the coupling-sections, of a gasket projecting from the face of the section in position to engage with another gasket on a corresponding coupling-section, and an offset or projection, extending laterally from the section beyond the gasket in position to engage with the corresponding coupling-section, to prevent rubbing contact between the gaskets, or between a gasket and the opposite coupling-section, until the openings through the gaskets are in proper alinement, substantially as set forth.

5. In a pipe-coupling, the combination, with a half-section, which is adapted to be automatically uncoupled from a similar half-section, of a gasket projecting from the coupling-surface of the half-section, and means whereby, when two half-sections are being uncoupled, the two half-sections may be separated by an automatic lateral movement effected by a longitudinal pull on one or both of the half-sections, whereby rubbing contact of the gaskets is prevented, substantially as set forth.

In testimony whereof I have hereunto set my hand.

JAMES BRYANT THOMAS.

Witnesses:
N. F. NIEDERLANDER,
W. A. THOMAS.